United States Patent [19]

Hureau et al.

[11] 4,189,292
[45] Feb. 19, 1980

[54] EXTRUDING HEAD FOR MAKING RETICULATED SEAMLESS TUBES

[76] Inventors: Jacques Hureau, Saint Remy des Monts 72600-Mamers; Jean-Claude Hureau, 56 rue Leon, 78310-Maurepas; Hubert Gaillard, 182 Av. Rouget de l'Isle, 94400 Vitry sur Seine, all of France

[21] Appl. No.: 886,548

[22] Filed: Mar. 14, 1978

[51] Int. Cl.² ............................................. B29D 23/04
[52] U.S. Cl. .................................. 425/290; 425/309; 425/467
[58] Field of Search .................. 83/185, 186; 264/156; 72/327, 333, 334; 425/DIG. 37, 290, 291, 325, 380, 467, 309

[56] References Cited

U.S. PATENT DOCUMENTS

| 3,132,985 | 5/1964 | Moore | 425/290 X |
| 3,703,116 | 11/1972 | Doll | 83/186 X |
| 3,817,671 | 6/1974 | Lemelson | 425/290 X |
| 3,841,815 | 10/1974 | Labarre | 425/325 X |

*Primary Examiner*—Mark Rosenbaum
*Attorney, Agent, or Firm*—Frishauf, Holtz, Goodman & Woodward

[57] ABSTRACT

A relative nutational movement is provided between a member carrying teeth or other radial projections and a member against which these projections bear, these two members being just downstream of an annular extrusion gap that produces a plastic tube which is slit by the teeth or other projections passing through the tube wall in succession and bearing against the backing member. As it comes out from the slitting or punching produced by these members, the tubular material is stretched to and over a mandrel and cooled there to produce a tubular netting or a perforated sheath. Either the toothed member or the backing member may be fixed while the other is moved in a movement of nutation and the toothed member may have externally or internally directed teeth.

9 Claims, 5 Drawing Figures

EXTRUDING HEAD FOR MAKING RETICULATED SEAMLESS TUBES

The present invention concerns an extruding head for making reticulated seamless tubes of synthetic resin material, preferably thermoplastic material.

French Pat. No. 1,449,252, shows an extrusion head for making tubular plastic netting of the kind here of interest, having an extrusion gap or slot running in a closed curve, preferably circular, to extrude a tube, and also a member having radial projections located downstream of the gap and driven in a nutation movement about an axis that coincides with the perpendicular line through the center around which the gap runs. In this device, the tube coming out of the extrusion head is still substantially in the plastic state and irregularities can occur which can best be explained by the failure of some of the radial projections to cut the tube and instead merely pushing it away, while others do pass through the material to make incisions which are spread into mesh openings when the tube is stretched and spread over a mandrel in a following step. Such irregularities are more marked if the extruded tube has a relatively great wall thickness, particularly when rigid or semi-rigid perforated sheaths or tubes are manufactured.

It is an object of the present invention to prevent the occurrence of such defects in the manufacture of perforated or reticulated tubes, even in the manufacture of relatively thick-walled tubes.

A particular object of the invention is to provide a drive for producing a nutational movement of one of the members of the extrusion head in which it is possible to vary the amplitude of the nutational movement by the substitution of easily provided interchangeable parts.

SUMMARY OF THE INVENTION

Briefly, the extrusion head is so constituted that the radial projections that press into the tube bear against a rigid member on the other side of the tube wall, so that the radial projections will all in turn completely penetrate the tube in the course of the nutational relative movement in the member bearing the radial projections and the rigid member against which these projections bear.

Either the member bearing the projections that penetrate the tube or the rigid member against which it bears may be fixed while the other is driven in a nutational movement. Similarly, the radial projections may be externally directed so as to penetrate the tube from the inside, or may be internally directed so as to penetrate the tube from the outside.

In all of these cases, however, the projections which do the penetrating are in fixed relation to each other and the nutational movement takes place with respect to all of the projections as a group. In accordance with the invention, therefore, a sort of backing is provided for the extruded tubular sheath by which it is assured that none of the projecting extensions of the member cooperating with it will merely push away the sheath and that the latter will assuredly be cut by each of the successive projecting extensions, to produce a perforated sheath or tubular netting with openings or meshes very uniformly distributed.

In order to supply the nutational movement, a member of the extrusion head that provides one of the peripheral walls of the annular extrusion gap carries a set of studs parallel to and equidistant from the axis of the extrusion head. An annular disk to be driven in nutational movement, so as to vary the opening of the gap at the gap end, is provided with round apertures larger than the stud cross-section and of the same shape, through which the studs pass, the different size establishing the amplitude of nutational movement. The driven annular disk is eccentrically mounted with respect to the axis of the extrusion head by means of a circular edge engagement with a mounting disk or ring which is driven to rotate about the axis of the extrusion head, the circular edge engagement, however, being eccentric with respect to the axis of the extrusion head, so as to impose in cooperation with the aforesaid studs and apertures, a nutational movement.

According to a first embodiment, the member having projecting radial extensions is constituted by a toothed wheel or crown and the rigid backing member against which it bears is constituted as a ring member that serves at least in part to extend one side of the extrusion gap. Such a design leads to a construction of extrusion head that is both sturdy and compact.

In another embodiment of the invention, the member carrying the radial extensions which penetrate the extruded tube is constituted by an inwardly toothed crown or ring fixed in stationary position while the backing member against which the endwardly directed teeth operate to cut the tube is constituted by a disk mounted and driven to move in a nutational movement. In this embodiment, the smooth cylindrical periphery of the disk driven in a nutational movement applies the extruded tube against the teeth of the crown member to produce the incisions.

In still another embodiment of the invention, in which a fixed inwardly toothed crown member is used as in the previously described embodiment, a disk within it that is driven in a nutational movement is provided with peripheral teeth. In one form of this embodiment, the teeth of the inner disk may bear against the teeth of the external crown to perforate the tube and in another form, the teeth of the disk are moved to fit closely between the teeth of the crown so as to produce incisions by a shearing action.

In still another embodiment, a stationary central body that may be simply an extension of the central core that forms the extrusion gap is used as a backing member for an encircling crown with internally directed teeth which is driven in a nutational movement, so that the teeth bear against the central member.

The invention is further described by way of illustrative examples of the various embodiments, with reference to the annexed drawings, in which.

Figure 1:
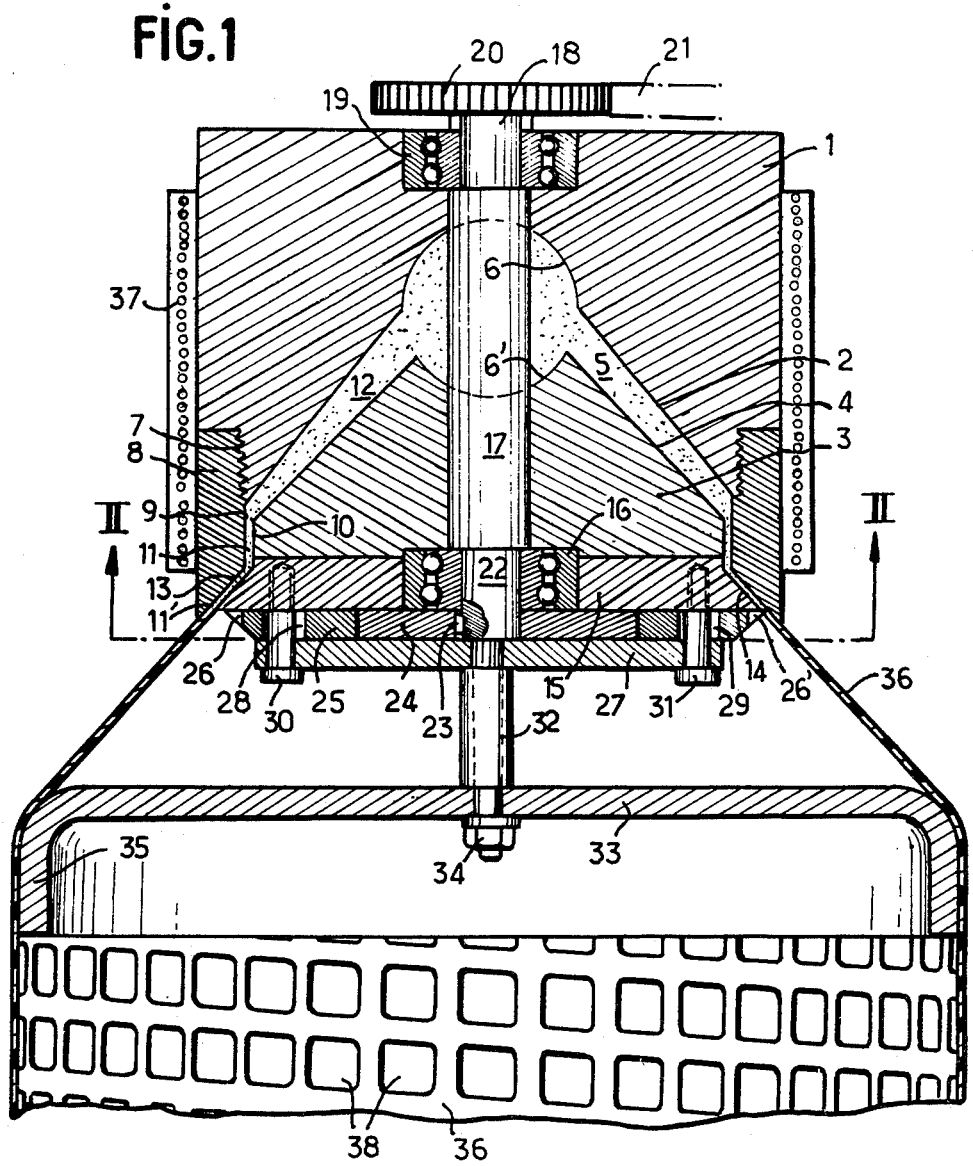
FIG. 1 is a section passing through the axis of an extrusion head according to the invention, forming part of an extruding machine, the remainder of which is not shown.

As shown in FIG. 1, the extrusion head according to the invention the principal member of the extrusion head is constituted by a block 1 of generally cylindrical form having a conical bore 2 centered in its interior that broadens out towards the bottom in the drawing. Within the conical bore 2 and spaced from its walls, a central core 3 is mounted by means not shown in the drawing so as to present an exterior conical surface 4 defining a passage 5 for the plastic material pressed into the extrusion head through a bore 6, 6' provided partly in the block 1 and partly in the central core 3, the material being pressed and driven to the extrusion head by extruder machinery not shown in the drawing. The block 1 may be referred to as the die member, the extrusion head that cooperates with the core member 3.

In the lower portion of the die block 1, a ring 8 is screwed in at 7 providing an interior cylindrical bore surface 9 at a certain spacing from a cylindrical exterior wall 10 provided on the core 3 in such a way as to provide an annular gap 11 for the passage of plastic material designated on the drawing by the reference numeral 12.

The threaded ring 8 terminates below with a conical portion 13 widening towards the bottom in the drawing, which is located at a certain spacing from a conical exterior wall surface 14 of a disk 15 that together with the conical wall 14 provides a prolongation in the direction of material flow of the annular extrusion gap 11.

The disk 15 is provided at its center with ball bearings 16 through which passes a shaft 17 of which the upper part 18 is mounted in another and similar bearing 19 provided in the upper part of the block 1, above which the upper end 18 of the shaft 17 carries a disk or pulley 20 around which passes a belt 21 driven by means not shown in the drawing.

The lower portion 22 of the shaft 17 extends beyond the bearing 16 and carries rotatively, by virtue of a spline 23, an eccentric disk 24 that is mounted within a ring 25 that on its exterior periphery carries teeth, more generally radially projecting extensions, 26, 26'.

This last-mentioned assembly is held in place axially by a face disk 27 positioned by studs 30, 31, 30', 31' screwed into the disk 15 in an array distributed symmetrically about the shaft 17, 22. The ring 25 is perforated with apertures such as those 28, 28', 29 and 29' shown in FIG. 2, through which pass bolts or studs such as those shown at 30 and 31 in FIG. 2, these bolts being of a diameter smaller than the apertures 28, 29 through they respectively pass.

The prolongation 32 of the shaft 17 carries, in a manner already known, a mandrel 33 held in place by a bolt 34, this mandrel having a skirt 35 serving to guide the tubular netting 36 extruded as will be presently explained below.

Finally, the extrusion head also comprises, in a known manner, a heating element 37. In order to explain the manner of operation of the extrusion head just described above for making reticulated seamless tubes, the explanation will be made, for convenience, in two stages. What will first be considered is the eccentric disk 24, the disk 25 having projecting radial extensions and the manner of their driving.

The plastic material, typically a thermoplastic material, passes through the chamber 12 into the gap 11 and finally by the gap 11' that is defined by the parallel conical surfaces 13 and 14. The material comes out in the form of a tube with continuous walls that passes over the mandrel 33 in a cooling bath not shown in the drawing, to be finally rolled up on a receiving apparatus of known form that is likewise not shown in the drawing. So far it has been assumed that the belt 21 and the shaft 17 are not being driven.

When the belt 21 is put into motion it turns the disk 20 that puts the shaft 17 into rotation. As a result of the presence of the eccentric disk 24 that is splined to the shaft 17 by means of the spline 23, the ring 25 carrying the radially projecting extensions 26, 26' is put into a nutation movement around an axis that coincides with the axis of the gap 11'. In consequence, the various radial projections execute radial movements and successively pass through the solid-walled tube that comes out of the gap 11', each one of these projections, after having passed through the wall of the extruded tube coming to bear against the internal wall of the conical bore 13' so as to produce clean incisions in the solid-walled tube, which are then enlarged as the tube moves in the direction of the arrow F to produce apertures such as those shown at 38 in FIG. 1.

The size of these apertures depends upon the shape of the radial projections 26, 26' as well as the ratio of the diameter of the mandrel 33 to that of the gap 11'.

Figure 2:
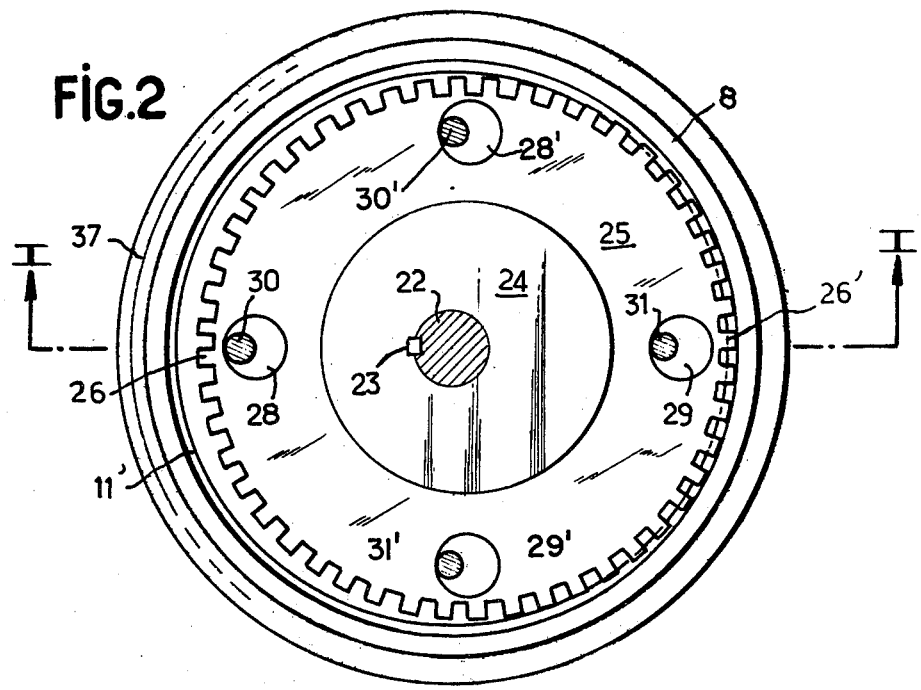
FIG. 2 is a section of the extrusion head of FIG. 1 along the line II—II.
Figure 3:
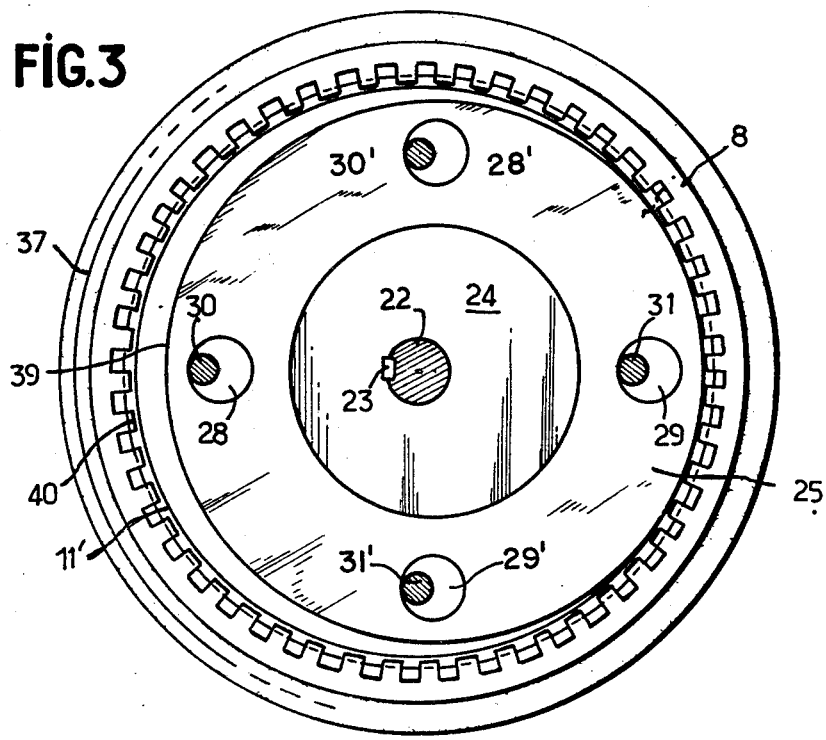
FIGS. 3 and 4 are sections corresponding to FIG. 2 and relating respectively to different embodiments of the extrusion head according to the invention.

FIG. 3 shows a modification of the embodiment of FIGS. 1 and 2, FIG. 3 being a cross-section analogous to that given in FIG. 2, with identical elements being designated by the same reference numerals.

The difference between the embodiment of FIG. 3 and that of FIG. 2 lies in the fact that in the embodiment of FIG. 3 the disk 25 driven in a nutational movement does not have any radial projections, but instead a smooth, circular periphery 39 which applies the solid-walled tube that is extruded by the gap 11' against the inwardly directed radial teeth 40 carried by the conical surface 13' of the ring member 8. This arrangement makes it possible to obtain a reticulated tube analogous to that shown at 36 in FIG. 1 having also grooves or traces on the exterior surface of the reticulated tubular product as the result of the relative disposition of the gap 11' and radial teeth 40.

Figure 4:
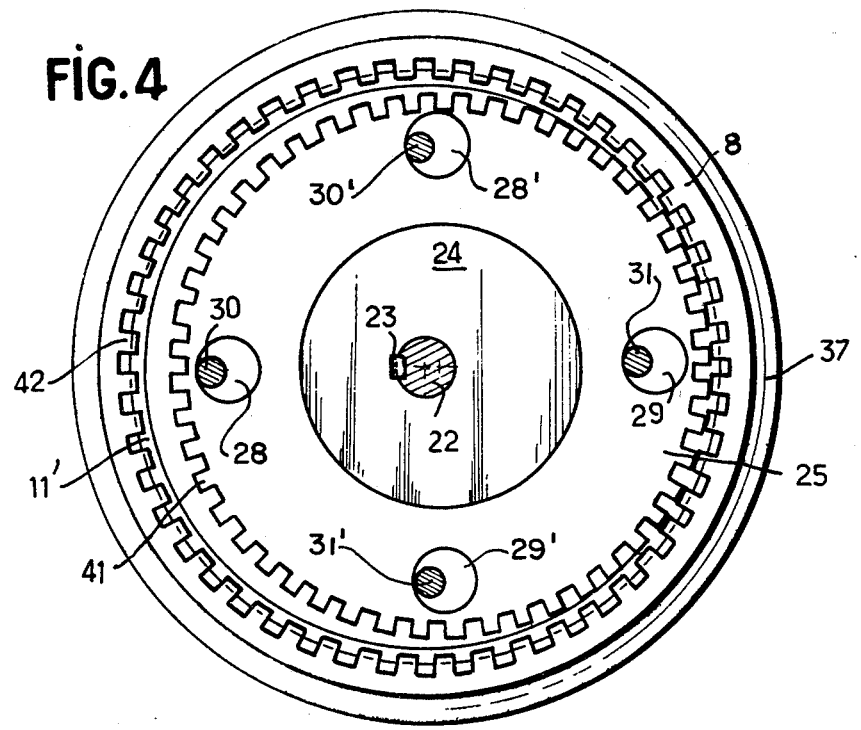

In FIG. 4 is shown another modification of the extrusion head of FIG. 1, likewise in a section analogous to that shown in FIG. 2, identical elements being designated by the same reference numerals.

In the embodiment of FIG. 4, the member 25 driven in a nutational movement has, as radial projections, the teeth 41, while the conical wall 13 of the member 8 has radial teeth 42. The teeth 41 and 42 can be arranged either so as to bear against each other or as to interfit. In both cases, a reticulated seamless tube product is obtained, like the one illustrated at 36 in FIG. 1, but having, as in the case of FIG. 3, longitudinal markings or grooves in its exterior surface.

Figure 5:
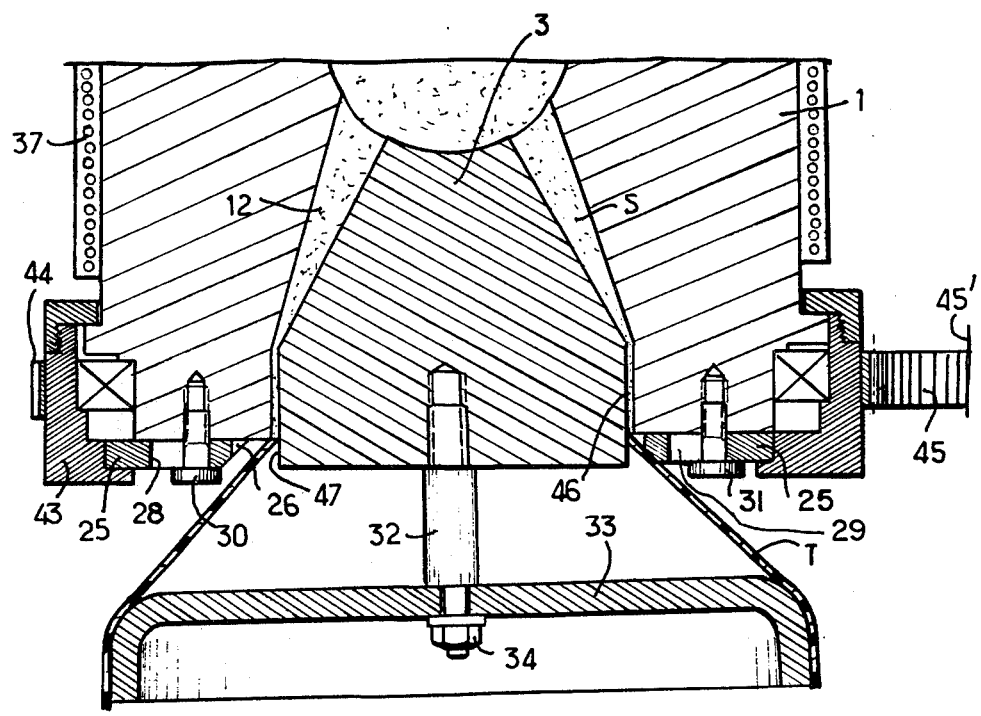
FIGS. 5 is a section passing through the axis of still another embodiment of extrusion head according to the invention.

The extrusion head illustrated in FIG. 5 differs from that of FIG. 1 in that the member 25 driven in a nutational movement carries radial cutting projections 26 on its interior circumference. Its movement of nutation is transmitted to it by an annular rotary support 43 having an eccentric internal cylindrical seating surface for the outside of the internally toothed annular disk 25 and provided with exterior gear teeth 44 cooperating with a toothed drive pinion 45. The disk 25, to impose a nutational movement, is here again provided with apertures 28 through which pass screw studs 30, 31 that are screwed into the body of the fixed die member of the extrusion head, namely the block 1.

When the pinion gear 45 is driven in rotation about its axis 45', it produces a rotary movement of the support ring 43 around the axis of the extrusion head. The support ring 43 in turn, because of the eccentric seating of the disk 25 within it, the latter being kept from rotating by the screws 30, 31, is thereby given its movement of nutation so that the teeth 26, in the course of their respective radial displacements, successively pass through the plastic tube T that comes out of the extrusion gap 46, these teeth in so doing bearing successively against the cylindrical portion 47 of the central core 3 of the extrusion head, where the core 3 is extended downward for the purpose of bearing against the teeth 26 as described.

Although the invention has been described with reference to particular illustrative embodiments, it will be recognized that still other modifications are possible within the inventive concept, as for example by variation of the shape of the teeth 26.

We claim:

1. In an extruding head for making reticulated seamless tubes of synthetic resin material comprising extrusion die means including a central core and a surrounding die member co-axial with said core and having a portion forming an annular gap therewith for causing said material to be extruded through a gap of a contour closed on itself, a perforating member bearing an array of radially projecting extensions mounted immediately downstream of said gap in a manner allowing a nutational movement so that said extensions may variably project across said gap and a fixed rigid member shaped and disposed so that said extensions of said perforating member will bear against said rigid member to assure perforation of said material when the respective extensions project completely across said gap in the course of said nutational movement, a drive for producing nutational movement of said perforating member, said drive comprising:

a set of cylindrical studs, respectively passing through apertures of said perforating member and mounted on said extrusion die means parallel with the axis of said core and surrounding die member, said apertures of said perforating member being of a diameter greater than that of said studs;

means for maintaining said perforating member axially in close proximity to said gap-forming portion of said extrusion die means near said gap with sufficient looseness to allow displacement of said perforating member in a plane transverse to said axis of said core and surrounding die member within limits allowed by engagement of said studs with said apertures; and means including a rotary member and an associated rotary drive therefor for driving said perforating member in rotation about said axis, said rotary member having a cylindrical surface eccentric with respect to said axis in sliding engagement with a cylindrical edge surface of said perforating member for causing said perforating member to respond to rotation of said rotary member by nutation around said studs.

2. An extruding head for making reticulated seamless tubes as defined in claim 1 in which a mandrel having a diameter greater than said gap is mounted centrally downstream from and spaced from said central core of said extrusion die means for stretching the perforated extruded tubular material as it is caused to pass from said gap to and over said mandrel.

3. An extruding head for making reticulated seamless tubing as defined in claim 1, in which said perforating member is constituted by an externally toothed wheel which has a circular hub aperture, said fixed, rigid member is constituted by a ring member providing an internal abutment surface for the teeth of said toothed wheel and said rotary member is a disk having an eccentric periphery engaging said hub aperture of said wheel.

4. An extruding head for making reticulated seamless tubes as defined in claim 3, in which said ring member is affixed to said die member of said extrusion die means, so as to constitute an extension thereof.

5. An extruding head for making reticulated seamless tubes as defined in claim 1, in which said perforating member of diameter greater than said gap is provided with internally projecting extensions, said fixed, rigid member is provided by an axial extension of said central core of said extrusion die means and said rotary member is a ring rotatably mounted on said surrounding die of said extrusion die means having an internal eccentric aperture in sliding contact with the periphery of said perforating member.

6. In an extruding head for making reticulated seamless tubes of synthetic resin material comprising extrusion die means including a central core and a surrounding die member coaxial with said core and forming an annular gap therewith for causing said material to be extruded through a gap of a contour closed on itself, a fixed perforating member bearing an array of radially projecting extensions mounted immediately downstream of said gap so that said radially projecting extensions extend at least to the edge of said gap or an axial projection thereof, but terminate short of bridging said gap and an annular disk having a circular hub aperture and having an external diameter not exceeding the internal diameter of said gap mounted immediately downstream of said gap in a manner allowing a nutational movement thereof for variably bearing against said extensions of said perforating member;

a drive for producing nutational movement of said annular disk comprising:

an inner disk having its periphery in sliding engagement with said hub aperture of said annular disk, said inner disk being eccentrically mounted on a shaft coaxial with said extrusion die means;

means for rotating said inner disk by causing rotation of said shaft; and means for restraining said annular disk against rotation about said shaft beyond the back-and-forth rotary component of a nutational movement.

7. An extruding head for making reticulated seamless tubes as defined in claim 6, in which a mandrel having a diameter greater than said gap is mounted centrally downstream from and spaced from said central core of said extrusion die means for stretching the perforated extruded tubular material as it is caused to pass from said gap to and over said mandrel.

8. An extruding head for making reticulated seamless tubes as defined in claim 6, in which said disk mounted in a manner allowing a nutational movement is provided with peripheral teeth for bearing against the internal teeth of said perforating member.

9. An extruding head for making reticulated seamless tubes as defined in claim 6, in which said disk mounted in a manner allowing a nutational movement is provided with peripheral teeth for penetrating between the internal teeth of said perforating member.

* * * * *